(12) United States Patent
Mathiesen et al.

(10) Patent No.: US 10,170,912 B2
(45) Date of Patent: Jan. 1, 2019

(54) DYNAMIC HYBRID CONTROL

(71) Applicant: Kongsberg Maritime AS, Kongsberg (NO)

(72) Inventors: Eirik Mathiesen, Kongsberg (NO); Bjørnar Realfsen, Kongsberg (NO); Petter Faugstad Johannessen, Kongsberg (NO); Nils Albert Jenssen, Kongsberg (NO); Ole Henrick Jørgensen, Kongsberg (NO)

(73) Assignee: Kongsberg Maritime AS, Kongsberg (NO)

( * ) Notice: Subject to any disclaimer, the term of this patent is extended or adjusted under 35 U.S.C. 154(b) by 0 days.

(21) Appl. No.: 15/559,889

(22) PCT Filed: Mar. 17, 2016

(86) PCT No.: PCT/EP2016/055823
§ 371 (c)(1),
(2) Date: Sep. 20, 2017

(87) PCT Pub. No.: WO2016/150815
PCT Pub. Date: Sep. 29, 2016

(65) Prior Publication Data
US 2018/0062388 A1    Mar. 1, 2018

(30) Foreign Application Priority Data
Mar. 20, 2015   (NO) .................................. 20150349

(51) Int. Cl.
*B63H 21/20* (2006.01)
*H02J 3/14* (2006.01)
*H02J 3/28* (2006.01)
*H02J 3/38* (2006.01)
*H02J 3/00* (2006.01)

(52) U.S. Cl.
CPC ................ *H02J 3/14* (2013.01); *B63H 21/20* (2013.01); *H02J 3/28* (2013.01); *H02J 3/381* (2013.01);
(Continued)

(58) Field of Classification Search
CPC ...... H02J 3/14; H02J 3/28; H02J 3/381; H02J 2003/003; B63H 21/20; B63H 2021/202; Y02T 70/5236; Y04S 10/54
See application file for complete search history.

(56) References Cited

U.S. PATENT DOCUMENTS

2009/0156068 A1   6/2009  Barrett et al.
2011/0281478 A1   11/2011 Blumenthal
(Continued)

FOREIGN PATENT DOCUMENTS

DE    102011085457 A1   5/2013
EP       2403093 A2     1/2012
(Continued)

OTHER PUBLICATIONS

Bergler, Christian, "International Search Report," prepared for PCT/EP2016/055823, dated Jun. 3, 2016, three pages.
(Continued)

*Primary Examiner* — Daniel Kessie
(74) *Attorney, Agent, or Firm* — Winstead PC

(57) ABSTRACT

The present invention relates to a system and method for controlling a power plant in a marine vessel. The system comprises at least one switchboard further comprising, a plurality of power plant members including, power suppliers such as power generators and energy storage elements, at least one consumer, and a Dynamic Hybrid Control unit comprising a measurement means for monitoring predetermined power plant and vessel related parameters, and a computational means for computing and predicting power
(Continued)

Figure 1:
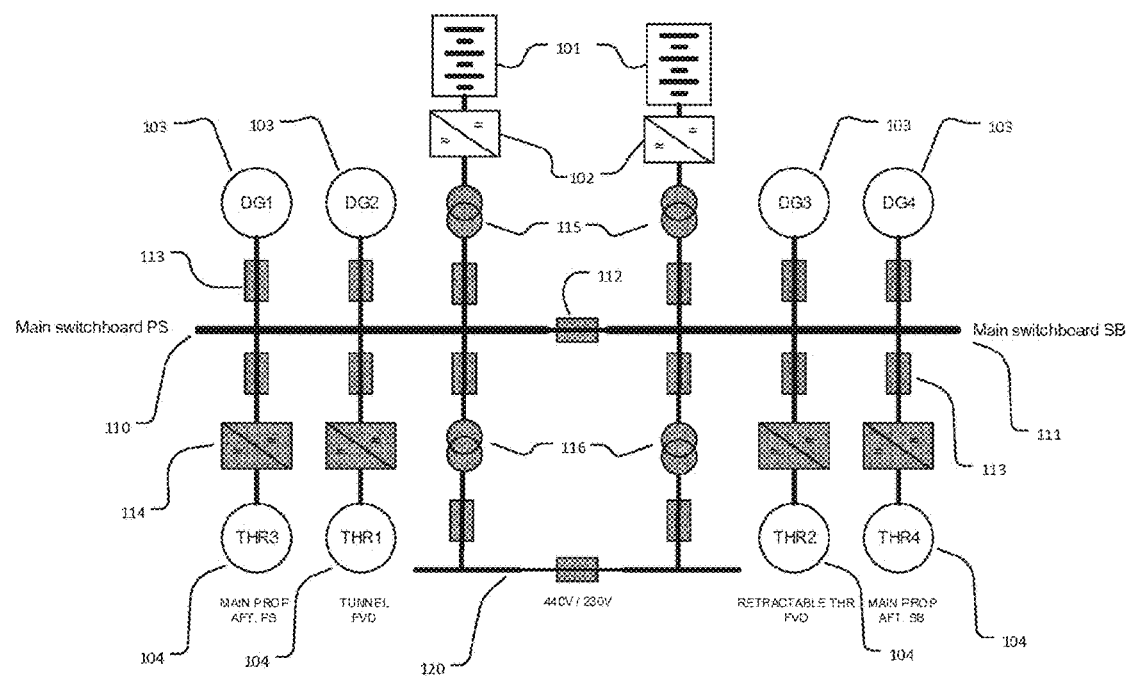

and energy requirements in the power plant for varying time spans into the future. The system utilizes said power and energy requirements for pre-planning and allocating of power and energy between said power plant members for minimizing transients, including voltage, frequency variations in the power plant and load variations on the power generators.

18 Claims, 4 Drawing Sheets

(52) U.S. Cl.
CPC ... *B63H 2021/202* (2013.01); *H02J 2003/003* (2013.01); *Y02T 70/5236* (2013.01); *Y04S 10/54* (2013.01)

(56) References Cited

U.S. PATENT DOCUMENTS

| | | | |
|---|---|---|---|
| 2014/0103727 A1 | 4/2014 | Taimela et al. | |
| 2015/0032306 A1* | 1/2015 | Mathiesen | B63H 25/42 701/21 |
| 2015/0051746 A1* | 2/2015 | Mathiesen | H02J 3/14 700/291 |
| 2017/0283023 A1* | 10/2017 | Ledere | F01N 5/02 |

FOREIGN PATENT DOCUMENTS

| | | |
|---|---|---|
| NO | 334364 B1 | 2/2014 |
| NO | 20131161 A1 | 3/2015 |
| WO | WO-2009030807 A2 | 3/2009 |
| WO | WO-2012092503 A2 | 7/2012 |
| WO | WO-2013164392 A1 | 11/2013 |

OTHER PUBLICATIONS

De Bruecker, S., et al., "Possible Application of Plug-In Hybrid Electric Ships," Electric Ship Technologies Symposium, 2009, IEEE, pp. 310-352.

Radan, D., "Integrated Control of Marine Electrical Power Systems," Doctoral Thesis, Dept. of Marine Technology, Norwegian University of Science and Technology, 2008, 231 pages.

Haschke, et al., "On-Line Planning of Time-Optimal, Jerk-Limited Trajectories," IROS Conference, Nice 2008.

Zahedi, B. et al., "Optimized Efficiency of All-Electric Ships by DC Hybrid Power Systems," Journal of Power Sources, Jun. 1, 2014, vol. 255, pp. 341-354.

\* cited by examiner

DYNAMIC HYBRID CONTROL

The present invention relates to a power management system used in hybrid marine vessels or installations.

Most modern marine vessels today use diesel-electric power system, meaning that the propulsion devices, such as thrusters, are driven electrically with power provided to them by diesel driven Motor Generator Sets (MGS). Some other MGS alternatives to diesel engines may be fuel cells, gas turbines, dual fuel engines, and their likes. The most common implementation of a MGS control system comprises a governor for speed control and a unit for automatic voltage control with set-point adjustment through a Power Management System (PMS), or alternatively all this done within a single unit.

Most marine vessels further comprise at least two control systems, a first control system that regulates the parameters on the power plant network or grid, and a second control system that regulates the motion of said vessel. The second control system typically achieves the regulation by controlling the parameters including, position, speed and heading. In more advanced vessels, motions such as yaw, pitch, roll, heave, sway and surge may also be controlled by a separate control system, or by another control system.

Said first control system, or the PMS, maintains safe operating conditions on the grid. The functions within the scope of the PMS include monitoring of the grid parameters such as voltage and frequency, and the ability to disconnect MGSs and consumers according to specific situations. The PMS may start or stop the MGSs according to the prevalent conditions on the grid. For minor regulation of the grid parameters, the PMS may vary the loading conditions on the running MGSs, instead of starting or stopping one or more of the stand-by MGSs. Other PMS functions may include the management of various protections and breakers on the grid and those for the consumers.

The functions of said second control system, for example, a Dynamic Positioning (DP) system, typically include control of the propulsion devices to fulfill the positioning related requirements, such as speed, heading and position, and may further include the control of stability of the vessel, for example by compensating for motions such as heave and sway on the vessel.

In a typical dynamic scenario, when the DP system is trying to maintain the vessel position, it issues instructions or signals to various propulsion devices such as thrusters to control the vessel parameters. Said instructions typically lead to fluctuations on the grid, said fluctuations are associated with the varying energy demand from the consumers. The PMS then tries to regulate the power plant parameters according to variations observed on the grid. To meet an increased demand, the PMS may vary the loading on the online MGSs or issue start instructions to stand-by MGSs. It may take several seconds from the issuing of the start command for the MGS to said MGS starting to supply power to the grid. Depending upon the dynamics of the fluctuations and the delays in the control loops, said control systems may get unstable and may result in situations such as partial or total blackout of the grid. In order to prevent such situations from occurring often, the systems are typically run with certain headroom, for example, the MGSs running on partial load, to deal with sudden transient situations in the system. Partial loading of the MGS is not desirable as it leads to high fuel consumption as well as pollution. Loading below a certain limit may be detrimental to MGS' health and service life span.

The offshore industry for many years has desired to reduce the number of online MGS without the risk of increased frequency and/or voltage variations or potential blackouts. As outlined above, there are several benefits from reducing the number of online MGSs, such as reduced emissions, lower fuel consumption, and reduced engine maintenance. For a given total power output on a grid, it is generally more economical and environment friendly to run a smaller group of MGSs at a high load, rather than running a larger group of MGSs at low load. However, the headroom requirements to be able to handle transients such as frequency and voltage variations on the grid typically mandate the requirement of a larger number of MGSs than those required for steady state or constant load operation.

A system for reducing frequency and voltage variations in the power distribution system is taught in NO 334364. Said system utilizes feedforward signals of the predicted load changes to minimize said variations on the grid. Although the system taught in NO 334364 will reduce rapid transients on the MGSs, it does not eliminate the variable loading conditions on the MGSs.

The technique of storing and deriving reserve capacity from batteries is covered widely in prior art. Such systems, also known as hybrid power systems, combine the conventional MGSs with chargeable batteries with an aim to reduce fuel-consumption and headroom requirements from the MGS. For example, in the article, "Optimized efficiency of all-electric ships by dc hybrid power systems", Zahedi, B., et al, Journal of Power Sources (Elsevier), Volume 255, 1 Jun. 2014, Pages 341-352, an optimization algorithm is proposed to minimize fuel consumption under various loading conditions. The study is performed by including diesel engines, synchronous generator—rectifier units, a full-bridge bidirectional converter, and a Li-ion battery bank as energy storage.

The article, "Possible application of Plug-in Hybrid Electric Ships", De Bruecker, S. et al, Electric Ship Technologies Symposium, 2009. ESTS 2009. IEEE, Pages 310-352, outlines various options for storing energy in batteries in hybrid ships.

US2011/0281478 A1 (Blumenthal) describes a combination of energy sources for marine propulsion to reduce fossil fuel-consumption and pollution. Amongst the proposed solutions, the use of rechargeable batteries is also included.

WO2009/030807 A2 relates to an arrangement for improving load response in a marine vessel.

None of the said publications teaches a system or method to plan and control the power and energy distribution between the energy storage elements, or batteries, and power generators, or MGSs. This and other problems inherent to the prior art will be shown solved by the features of the invention outlined in the following description and specified in the accompanying claims.

The present invention relates to a Dynamic Hybrid Control System (DHS) that comprises mechanisms for improved utilization of the characteristics of each power supplier in a hybrid power distribution system without compromising the vessel control for a dynamically positioned vessel.

In this text we use the terms such as MGS, generators or power suppliers, unless specifically meant, without limitation or loss of generality to refer to electrical power generators including mechanical devices such as diesel generators (DG), gas turbines, duel fuel engines and their likes irrespective of the fuel type.

We will further use the terms energy storage device, energy storage unit, battery or capacitor, interchangeably, unless specifically meant, without limitation or loss of generality to refer to electrical power suppliers that are characterized by the storage and release of energy, for example, as associated with the charging and discharging respectively in case of a battery.

The system proposed in the present invention comprises an Energy Control System (ECS) coupled to at least two different power suppliers providing power to a DP system comprising a DP control system and thrusters powered by said power suppliers. At least one of these power suppliers is a power generator and at least one of said power suppliers is an energy storage device. The ECS is adapted to plan and control the allocation and flow of energy and power to various parts of the system.

The DP control system according to the present invention predicts low frequency (LF) or gradually varying power and energy demand. Said prediction is used by the ECS to share load between slow and fast power suppliers. In this, power generators, MGS and their like may be termed as slow power suppliers, whereas energy storage devices or batteries may be termed fast power suppliers. The proposed terminology of slow and fast power suppliers is rather qualitative i.e., in certain embodiments MGS, that typically require a response time of the order of a few seconds or higher to start supplying power to the load, be classified as a slow power supplier. In another embodiment, power suppliers such as adequately charged batteries or adequately charged capacitors or their likes are classified as fast power suppliers as they can supply power to the load almost instantly.

Conventional Power Management Systems are typically reactive in nature, in other words, such systems start to act after they detect deviation in the grid parameters. Critical grid parameters typically include, voltage and frequency, in addition the generators connecting to the grid need to be synchronized in phase. In a typical reactive system, the command to regulate the generators is sent after the system detects change in the grid parameters from their respective nominal values. If said deviations or transients in the grid parameters are caused by high power consumers such as thrusters, then said transients will normally be large. This scenario will mandate that the power management system somehow ignores the temporary transients, for example as proposed in Norwegian patent NO 20131161, otherwise it may lead to unnecessary transients in the power generators thereby causing increased wear, fuel-consumption and pollution, and in the worst case result in the collapsing of the grid, depending upon the stability of the feedback loop that regulates the grid parameters. This problem increases in complexity as the number of high power consumers connected on the grid increases.

The present invention proposes a functionality that allows planning of various scenarios and not only preparing the PMS in advance to handle the upcoming transients, but also deploying fast power suppliers using feedforward whenever appropriate in such a way that the resulting system as proposed by the invention results in substantial elimination of the fluctuations on the grid.

In his doctoral thesis "Integrated Control of Marine Electrical Power Systems", D. Radan mentions propulsion load rate limiting to reduce excessive stress on prime movers (engines) due to propulsion loading, which is a common approach in marine industry, whereby fixed slew rate limits are set on electrical thrusters. Much further, in another part of the thesis, Radan lists energy storage devices such as batteries, capacitors and their likes as one of the possibilities to attenuate the frequency variations on the generators. Said document does not teach the adapting of the load ramp based on the availability of the power suppliers such that the response, for example, acceleration, of the position control is scaled relative to the response of the power distribution system. The present invention further presents a way of linking the load control with the position/velocity control of the vessel which is novel with respect to the prior art found as on date.

The invention will be described more in detail below with reference to the accompanying drawings, illustrating the invention by way of examples.

Figure 2:
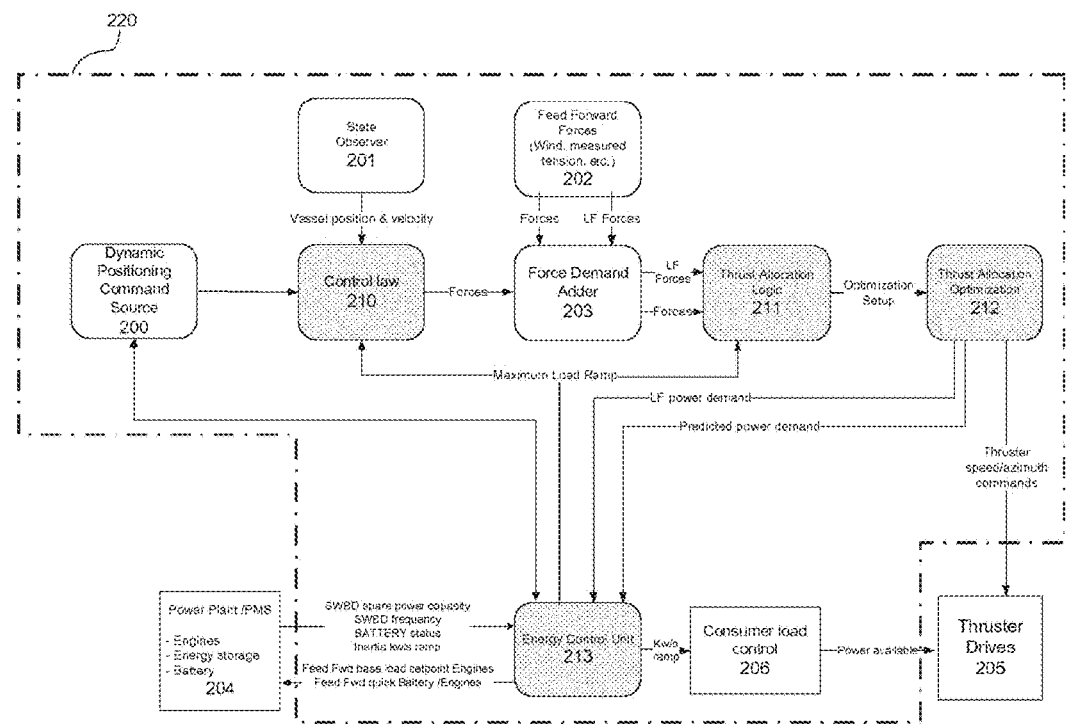
Figure 3:
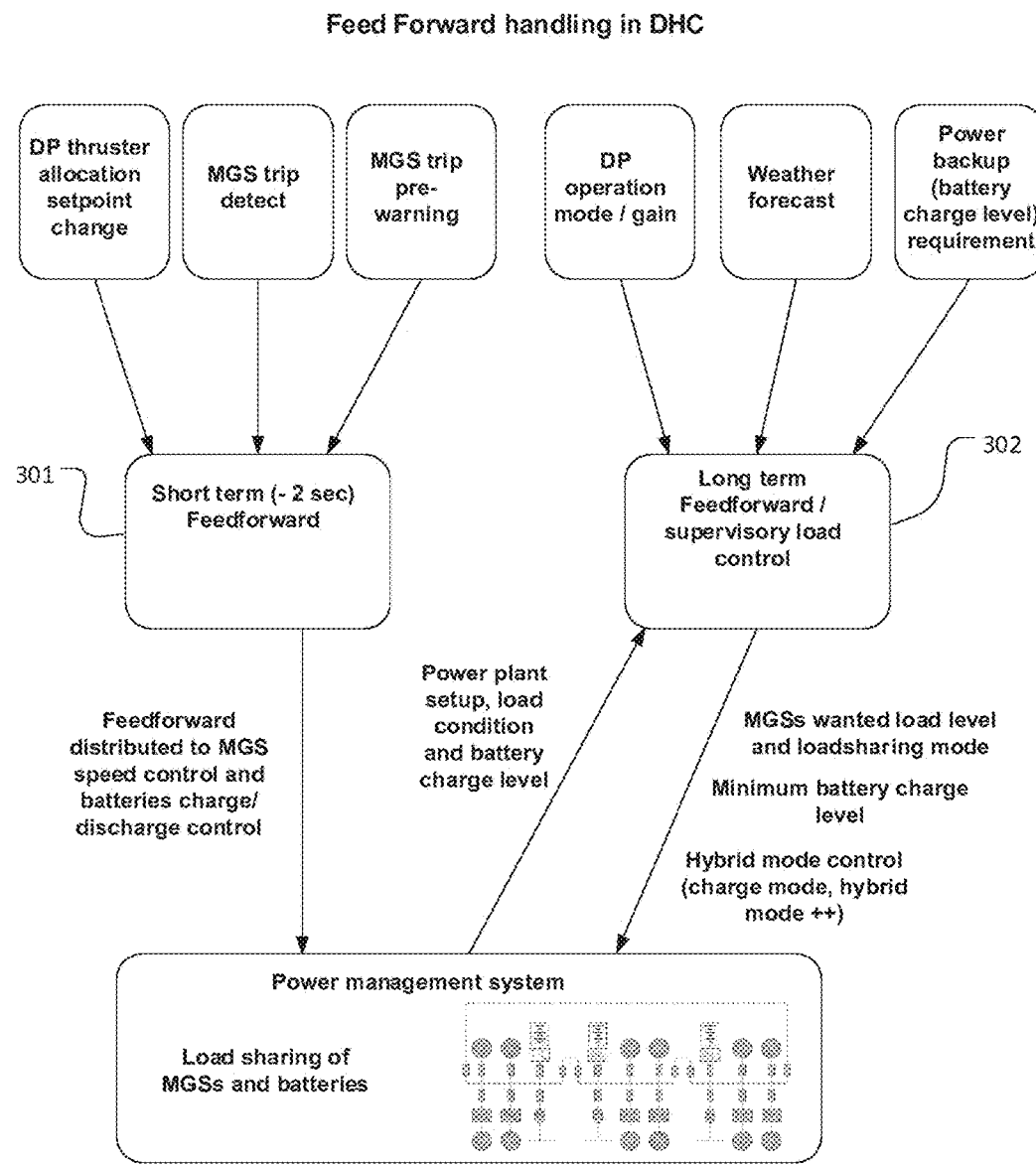
Figure 4:
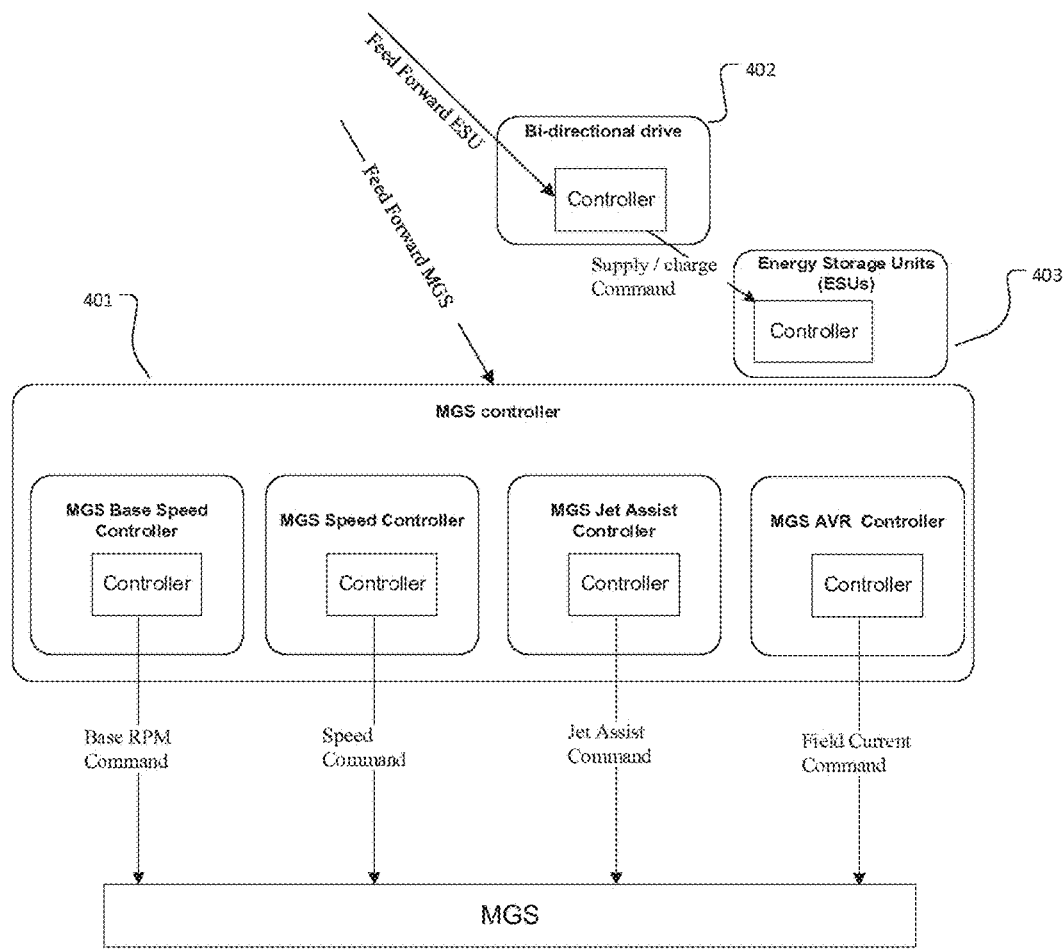

FIG. 1 illustrates an embodiment of a typical power plant comprising different power suppliers and consumers FIG. 2 illustrates an embodiment of the system proposed according to the present invention FIG. 3 illustrates an embodiment of the feedforward handling system according to the present invention FIG. 4 illustrates an embodiment of the feedforward handling mechanism adapting the power suppliers according to the present invention FIG. 1 shows an example of a typical power plant setup comprising various power generators such as MGS that in this example are termed Diesel Generator (DG) sets (103), energy storage devices are batteries (101) in this specific example. The power and energy flow to and from the batteries is adapted by a converter (102). Said converter (102) typically performs a first conversion from an Alternating Current (AC) type signal, current or voltage, to a Direct Current (DC) signal, current or voltage, whilst sending charge into the batteries. Another term to describe such first conversion is rectification. Said converter (102) also performs a second conversion from the DC voltage of the battery to an AC domain signal, typically voltage, whilst sending charge from the batteries to the switchboard or grid. Another term to describe such second conversion is inversion. According to an embodiment of the invention, the system may use additional conditioning of said AC voltage, for example, by using transformers (115) or other devices with similar functionality. Said transformers (115) may be used to achieve higher AC voltages (stepped-up) on the switchboard side as compared to the battery side. Similarly, while charging the batteries (101), the same transformers (115) perform step-down operation, i.e., bring down the voltage levels from the switchboard side to the battery side. In another embodiment of the invention, the energy storage devices (101) are capacitors. In an alternative embodiment of the present invention, the system may utilize a mixture of pluralities of batteries, capacitors or other devices with similar functionality to exploit the advantages associated with each type of energy storage device.

Although the example shown in FIG. 1 discusses a particular embodiment comprising AC switchboard and certain DC components, the present invention is not limited in any way towards a specific switchboard configuration or the extent of AC or DC domains in the system. The proposed DHC concept applies equally well to other bus systems including, fully DC or other mixed AC/DC systems.

In one embodiment, the main switchboard is split in different sections. Referring specifically to the example in FIG. 1, the first section is called main switchboard port side (110) and the second section main switchboard starboard side. Said sections are normally coupled together with a tie-breaker (112). Said switchboard may further be subdivided into other sections, for example, to improve the availability of the system in case of faults or maintenance on specific sections of the main switchboard. The main switchboard may further supply power to low voltage switchboards (120), in this case a voltage conversion is achieved using, for example transformers (116) or their likes.

The main switchboard is further connected to a plurality of consumers (104), or thrusters specifically referring to the exemplification shown in FIG. 1. Each thruster (104) is adapted by an individual control module (114), which is used, for example, to set power and load rate limitation on the thrusters.

Each power supplier and consumer is coupled to the specific switchboard section through an individual protection breaker (113). Said breaker is used to disconnect the specific power supplier or consumer from the switchboard whenever required, for example, in case of fault or to isolate a specific device for maintenance.

FIG. 2 shows an embodiment of the system comprising a Dynamic Hybrid Control unit (220) as proposed in the present invention. The proposed system comprises modules including, Control Law (210), Thrust Allocation Logic (211), Thrust Allocation Optimization (212), Energy Control Unit (213) and Consumer Load Control (206).

For the sake of simplicity, only typical signal names and flows are shown in FIG. 2. Said signal names are labeled on the arrows representing signal flow between the various modules in the system.

The scope of the proposed Control Law module (210) includes calculation of the force demand in each of the controlled axes in order to compensate for deviations between the operator or system specified position and velocity and the measurements of actual vessel position and velocity (201), for example, by a PID controller. The Control Law (210) receives a signal value indicating maximum load ramp computed by the Energy Control Unit (213). Said load ramp typically limits the response time for the thrusters and thus the available change in acceleration or jerk for the vessel. The received maximum load ramp value is converted into a maximum jerk value by the Control Law module (210). Said maximum jerk value is used by the Control Law (210) for adjusting the parameters, for example, adapting the PID gain values, in the position and velocity controller to ensure that the said controller does not get unstable if the load ramp drops to a very low value. In other words, the scope of the Control Law module (210) includes the monitoring of said PID gain values to ensure the stability of the controller.

In order to change the vessel's position or heading the Control Law (210) generates a constant jerk trajectory to derive reference values for parameters including, position, speed and acceleration to be used by the position and velocity controller during the process of said change. A typical jerk trajectory generator is described, for example, in Haschke et al, "On-line Planning of Time-Optimal, Jerk-Limited Trajectories" IROS conference, Nice 2008. The trajectory generation takes the maximum jerk into account when a trajectory is produced to ensure that the vessel is capable of following the derived trajectory reference.

The Force Demand Adder module (203) receives inputs comprising real-time measurements of forces including, wind and tension, from a measurement module (202). The Thrust Allocation Optimization module (212) solves a non-linear optimization problem in order to calculate the parameters including, thrust amount and direction for each thruster, propeller and rudder controlled by the DP control system such that the thrust demand in each axis given by the Force Demand Adder (203) is fulfilled. Other constraints for the optimization problem may also apply, such as power limitations and barred thrust sectors. One of the main objectives for the minimization problem solved in Thrust Allocation Optimization module (212) is to minimize the total power usage for the consumers such as thrusters and propellers. The Thrust Allocation Logic (211) typically sets up the objectives and constraints for the optimization problem to be solved by the Thrust Allocation Optimization module (212).

In an embodiment of the DHC system presented in the invention, two optimization problems are solved. The first problem involves allocation of the forces needed by the DP control system, and that result in the system providing command signals sent to the thrusters. Said allocation takes into account the maximum load ramp computed by the Energy Control Unit (213) so that the changes in the thruster command signals provided by the Thrust Allocation Optimization (212) are always harmonized with the changes in the maximum load ramp signals. The second problem solved by the Thrust Allocation Optimization module (212) uses a low frequency (LF) force demand provided by the Force Demand Adder (203) to the Thrust Allocation Logic (211). Said LF force demand is converted to LF thrust value for each thruster by the Thrust Allocation Optimization (212) and is used to calculate a LF power demand for each thruster. Said LF power demand is sent to the Energy Control Unit (213) where it is used as one of the references to compute the base load for the MGSs.

A DP controlled vessel that is drifting away from the position setpoint will typically have an increasing power demand until the control system aligns the vessel position back with the position setpoint. The DP control system estimates the maximum power usage for each specific drift, for example, by utilizing prediction models, and computes the integral of the power usage as stated in NO 334364. In another embodiment of the present invention, said estimations of power are used in the DHC to plan and execute the power distribution. In another embodiment of the present invention said prediction model is routinely updated based on the actual runtime characteristics of the vessel to improve the accuracy of said model.

In order to further demonstrate some of the key capabilities of the present invention, following list of features achieved by the invention are presented.

Dynamic Capacity:

In the system and method according to the present invention, the ECS (213) automatically adapts to the power plant configuration and type of MGSs and energy storage units, such as batteries or capacitors, and calculates the total amount of available load ramp at any particular instant (kW/s). The calculated total load ramp values are sent to the DP control system and used so that the changes in the thruster command signals provided by the Thrust Allocation Optimization (212) are always harmonized with the changes in the maximum load ramp signals. In another embodiment, the system automatically takes into account the change in dynamic or available instantaneous power capacity based on characteristics of the connected MGS and battery units, since the dynamic capacity of the battery may vary substantially based on the charge/discharge rate for the battery. Charge/discharge rates are typically associated with the operating conditions, such as temperature, of the battery. If, for example, the battery has been driven close to or higher than its normal C-rating, the battery temperature will typically rise, which may require that said battery to be operated at a lower power delivery rate (kW/s) and/or maximum total discharge (kW) for a certain time after a high load operation, for example, a quick discharge. The kW/s value is further sent and used inside Consumer Load Control (206) as an extra protection or for other consumers not controlled by DP.

In yet another embodiment of the present invention, if the DP control system finds that the total available load ramp (kW/s) value is less than that required in a particular scenario, the DP system communicates a signal to the ECS module (213) indicating the shortfall from said requirements. In another embodiment of the present invention, the ECS (213) raises the setpoint of one or more MGSs, or issues a start command to one or more MGSs in standby to meet the requirements communicated by the DP system.

Low Frequency (LF) Feed Forward from DP:

In an embodiment of the present invention, the system uses LF feed forward power demand forecast in the ECS to set the base load setpoint on the running MGS units. By doing this a stable loading of the running MGS units is achieved. The MGS are compensated according to the LF weather forecast and prediction models in the DP system. The variable loading conditions are absorbed by the energy storage units, such as batteries or capacitors. According to the proposed feature, the system does not need to wait for the charge state of the battery to change to move the setpoints for the MGS units. The system, hence acts proactively as opposed to the reactive nature of the conventional systems, including those employing hybrid power suppliers. This is summarized as a simplified comparison of the present invention with the traditional non-hybrid and traditional hybrid schemes in the following table (Table I).

TABLE I

Comparison of the Present Invention with Traditional Power Systems.

| Traditional Power System | Traditional Hybrid Power System | Present Invention |
| --- | --- | --- |
| 1. DP system sends command to thrusters | 1. DP system sends command to thrusters | 1. DP system sends command to thrusters |
| 2. Thrusters start reacting hence "requesting" more power | 2. Thrusters start reacting hence "requesting" more power | 2. Thrusters start reacting hence "requesting" more power and battery is "opened" to provide additional power (feed forward) |
| 3. Line frequency and voltage will drop slightly | 3. Line frequency and voltage will drop slightly | 3. Line voltage and frequency will not drop and thus remain substantially stable. |
| 4. Diesel engines will speed up to restore line frequency and voltage (feedback loop) | 4. Battery will "open" to restore voltage and diesel engines will speed up to restore line frequency and voltage (feedback loop) | 4. Diesel engines will not speed up |

State of Charge Load Control Unit (SLCU):

In another embodiment of the present invention, the ECU (213) includes a State of Charge Load Control Unit (SLCU) that maintains a certain load level on the MGSs computed based upon a battery State of Charge (SOC) feedback signal. The SLCU computes the required delta in overall loading of the MGS system and distributes said loading between running MGSs by adding a predetermined fraction of the said delta to the LF setpoint of each of the MGS units running in base load mode. The advantages of such distribution include stable loading on the MGS units. In further an embodiment of the present invention, the predetermined fraction added to one running MGS is different from the fraction added to other running MGS for further optimizing the loading, for example, based on the characteristics of a specific MGS.

In yet another embodiment of the present invention, the SLCU also responds to all other load changes in the power system and includes these load changes in computation for said delta. Said other load changes generally refer to loading associated with consumers except the DP and prediction systems.

In an embodiment of the present invention, in extreme cases, if the energy storage unit cannot handle the step in instantaneous load (kW/s), the corresponding extra load is added to the setpoints of the MGS units directly instead of waiting for the SLCU to adapt to the new situation.

In another embodiment of the present invention, the SLCU receives signals for forecast or prediction of power consumption including, total load consumption from the DP system. Said signals are typically related to motion parameters including, predicted or planned vessel movements, for example, based upon trajectory calculations, and weather related data. In yet another embodiment of the present invention, said signals are used in the proposed feed forward scheme to adapt the behavior of the SLCU. In another embodiment of the present invention, the system routinely compares the accuracy of the predictions or forecasts and adapts the DP system to improve the accuracy of future predictions or forecasts.

High Frequency Feed Forward, Dynamic Load Prediction (DLP):

In Norwegian patent NO334364 a DLP system was introduced. In another embodiment of the present invention, short-term load changes from DP consumers are distributed from the ECS (213) to the energy storage units, such as batteries, to handle fast load variations or transients. The ECS (213) receives feed forward signals from the DP system and distributes the fast load transients amongst the battery units. Upon receiving commands from the ECS (213), the battery units start supplying power for said fast load variations. The MGS units follow the base load setpoint set by the ECS (213) to keep a stable load. According to the proposed system, the batteries are kept ready in advance for delivering power for future nominal transient conditions such that the MGS units do not need to vary their loading to meet said demand and hence are able to keep operating on MGS base load setpoints. In another embodiment of the present invention, the system aligns the MGS base load setpoint according to available battery capacity and forecast or prediction of upcoming loading profiles and weather related data, such that the system prevents the fast load transients being handled by the MGSs. In yet another embodiment of the present invention, the available battery capacity is estimated or measured routinely, for example, by temperature measurements, charge or discharge profiles, battery operating history, battery models or their likes, or other measurements that provide an indication of available battery capacity at a particular instance. In further an embodiment of the present invention, the system adapts the operation of the energy storage units or batteries such that the lifetime of said storage units is maximized. In another embodiment of the present invention, the system distributes the load amongst the storage units such that certain predetermined parameters are optimized. In another embodiment of the present invention, said predetermined parameters include battery life, maximum load transients, costs, mean time between failure, fuel consumption and total power consumption.

An embodiment of the feed-forward handling mechanisms in the DHC according to the present invention is exemplified in FIG. 3. The signal handling of the feedforward signals is segregated into two main categories, i.e., short-term (301) and long-term (302). The system may comprise further sub-divisions of feedforward signals, for example, mid-term feedforward signals, but for the sake of simplicity, only two categories are shown in FIG. 3. The short-term signals may, for example, be defined as those associated with events that occur within the time-frames of the order of 2 seconds or less. Such short-term events may include, DP thruster allocation setpoint change, MGS or DG trip detect and MGS trip pre-warning. The long-term feedforward mechanism (302) is also associated with long-term prediction and supervisory load control. The long-term feedforward module (302) issues command related to those including, desired MGS load level, or MGS base load, load sharing mode, required minimum battery charge level, and specific control modes for hybrid operation such as, charge only, peak shaving and island mode. Said module (302) receives inputs including, DP operating mode, DP system gains, weather and marine activity related forecasts, and battery charge level requirements or other constraints. The module (302) may also receives signals related to the power plant, including, power plant setup such as status of breakers, MGSs, and other components, load conditions, and battery related parameters, such as charge level, temperature, or other signals related to battery health and status.

FIG. 4 illustrates an embodiment of the system according to the present invention, where it is shown how feedforward signals are used within the MGS control and the ESU control. The feedforward commands issued to the MGSs are received by the MGS controller (401), said controller evaluates the received command and adapts internal controllers to achieve the desired system status. Said internal controllers for the MGS system include, base speed controller, speed controller, jet assist controller, and automatic voltage regulator (AVR). Said internal controllers adapt the MGS running parameters. The feedforward signals issued to the ESUs are received by a controller in the bidirectional drive unit (402). The functions of said unit (402) include the conversion between the ESU voltage, which is typically DC, and the power plant voltage, which is typically AC, charge and discharge control of the ESUs and issuing commands to the ESUs according to available power or supply, and demand. Said commands are received by a controller for the ESUs (403) that adapts the ESUs according to the received commands and status of the respective ESUs.

To summarize, the present invention is a system and method for controlling a power plant in a marine vessel. Said power plant comprises at least one switchboard and said switchboard includes at least one switching device, such as breaker. The system further comprises at least one consumer; typical consumers include propulsion devices such as thrusters and propellers, and rudder. Said system further includes, at least one power generator supplying electrical power, and by way of that supplying energy, to said switchboard, and at least one energy storage device coupled to the switchboard. By coupled, it is here meant that other electrical devices or components might be connected between said energy storage device and the switchboard. Said other electrical devices or components may be breakers, transformers and power converters.

Typical energy storage devices include batteries and capacitors. The energy storage device is capable of storing excess energy from the switchboard, and capable of sourcing said stored energy through the switchboard to one or more consumers coupled to said switchboard.

Power plant members, including said power generator or a plurality of power generators, said energy storage device or a plurality of energy storage devices, and said consumer or a plurality of consumers are coupled to a Dynamic Hybrid Control (DHC) unit. Said DHC unit is capable of adapting and controlling each of said power plant members to control the allocation and flow of power and energy on said switchboard. For example, the DHC unit is capable of raising the setpoint of one or more power generators such that the power (or energy) in excess to that used by the consumers, is used to charge the energy storage devices such as batteries. The DHC unit is further capable of issuing start command to one or more power generators those are in stand-by condition, such that said stand-by generators may come online. Similarly, the DHC unit can issue commands to send one or more online generators in stand-by condition, if suitable. The DHC unit is also capable of deciding the charge and discharge rate for one or more energy storage devices.

Said DHC unit further comprises a measurement means for monitoring predetermined power plant and vessel related parameters, said power plant and vessel related parameters include forces, tension, weather and marine parameters, speed, acceleration, heading, voltage, current, frequency, power, phase and energy storage device parameters. Said DHC unit also comprises a computational means for computing and predicting power and energy requirements in the power plant for varying time periods into the future, based upon data including; the parameters monitored by the measurement means, pre-determined models, lookup tables, and expected energy flow trends related to one or more power generators, one or more energy storage elements, and one or more consumers. Said computational means also comprises a storage means for storing or logging said data. Said storage means is, for example, a digital memory such as a hard disk, flash based memory or types of memories or storage media.

The system according to the present invention utilizes said power and energy requirements predicted by the computational means for pre-planning and allocating of power and energy between one or more power generators, one or more energy storage elements, and one or more consumers. In other words, the system pre-plans the power (and by that, also energy) requirement scenario for upcoming events and segregates the said scenario into a minimum of two different categories, the first category comprises low-frequency requirements, and the second—high-frequency requirements. The low-frequency power (or energy) requirements are typically used to regulate the setpoints of one or more power generators, whereas the high-frequency power (or energy) requirements are used to prepare one or more energy storage devices in advance such that the transient loading conditions on the switchboard or grid can be handled by said one or more energy storage elements. By doing this, the system is able not only to minimize fluctuation of grid parameters, such as voltage and frequency, but also able to maintain a relatively constant optimum load on the online power generators. By said optimum load, it is meant criteria such as, that operating region or operating point of the power generators where said power generators are, for example, efficient in terms of fuel consumption, and/or where the wear and tear in said power generators is around minimum, and/or where the emissions from said power generators are around minimum. Such criteria can be specified by an operator or user of the system as one of the pre-determined inputs that the system uses to adapt or control the power plant members. The system can further utilize measurements from the measurement means to monitor, compute, and update optimization criteria for each of the power plant members.

The system is further able to compute, program and monitor parameters such as required battery charge, charge/discharge rates, number of power generators that need to be online, setpoints of online generators, thrust, and load limitations that need to be imposed on different consumers, in such a way that the overall power consumption in the power plant for each different scenario is minimized. The system continuously monitors and updates said parameters to maintain efficient working of the entire power plant.

Since the grid fluctuations are reduced drastically, the requirements on the power generator system are also drastically reduced. The power generators according to the present invention do not normally require to handle transient loading conditions, and can operate at an optimum constant load such that wear and pollution is drastically reduced as well. typically and for minimizing transients, including voltage, frequency variations in the power plant and load variations on said at least one power generator due to said transients.

The system further achieves an unusual coordination between the load control system and the position/velocity control system, such that said systems work together rather than potentially working against each other as observed in traditional systems.

The system hence achieves several performance, cost, and operational advantages over traditional systems. The system can also be configured to function as traditional system if so desired.

The invention claimed is:

1. A system for controlling a power plant in a marine vessel, the power plant comprising;
   at least one switchboard including at least one switching device, and at least one consumer; and
   at least one power generator supplying electrical energy to the at least one switchboard; and
   at least one energy storage device coupled to the switchboard capable of storing excess energy from the switchboard, and capable of sourcing the stored energy through the switchboard to the at least one consumer;
   wherein the at least one power generator, the at least one energy storage device, and the at least one consumer are coupled to a Dynamic Hybrid Control (DHC) unit, the control unit controlling the flow of energy on the at least one switchboard;
   the DHC unit further comprising;
      measurement means for monitoring predetermined power plant and vessel related parameters; and
      computational means for computing and predicting power and energy requirements in the power plant for varying time spans into the future, based upon data including, the parameters monitored by the measurement means, pre-determined models, and expected energy flow trends related to the at least one power generator, the at least one energy storage element, and the at least one consumer,
   wherein the system utilizes the power and energy requirements predicted by the computational means for pre-planning and allocating of power and energy between the at least one power generator, the at least one energy storage element and the at least one consumer for minimizing transients, including voltage, frequency variations in the power plant and load variations on the at least one power generator due to the transients; and,
   wherein the system transmits feedforward signals for functions including, the prediction, the pre-planning and the allocation; the feedforward signals including, power demand;
      adapting energy storage devices for handling the transients;
      adapting set-point of the at least one power generator; and setting load limitation on the at least one consumer.

2. The system according to claim 1, wherein the power and energy requirements predicted by the computational means are further used in the system for allocating and adapting the flow of energy between the at least one power generator, the at least one energy storage element and the at least one consumer, such that overall energy consumption in the power plant is minimized.

3. The system according to claim 1, wherein the energy storage device is a battery.

4. The system according to claim 1, wherein the energy storage device is a capacitor.

5. The system according to claim 1, wherein the measurement and computational means comprises, at least partially, a Dynamic Load Prediction system.

6. The system according to claim 1, wherein the at least one consumer includes, propulsion device, such as thruster and propeller, and rudder.

7. The system according to claim 1, wherein the at least one consumer is adapted by an individual control module associated with each of the consumer.

8. The system according to claim 1, wherein the DHC unit at least partially comprises a DP system.

9. The system according to claim 1, wherein the DHC unit, further comprising an Energy Control Unit, computes a maximum available load ramp (kW/s) value based upon the status of the at least one energy storage device and the at least one power generator.

10. The system according to claim 1, wherein the system also comprises a Thrust Allocation Module, the Thrust Alocation Module solving at least one non-linear optimization problems to calculate parameters including, thrust amount, load rate, and direction for each of the propulsion devices, for minimizing the overall energy consumption in the power plant.

11. The system according to claim 1, wherein the DHC unit comprising an Energy Control Unit computes a maximum available load ramp (kW/s) value based upon the status of the at least one energy storage device and the at least one power generator, and the system solves an optimization problem based upon a force allocation signal issued by the DP system and the maximum available load ramp value, and then issues a command signal for the propulsion device such that the command signal for the propulsion devices is always harmonized with the maximum available load ramp signal.

12. The system according to claim 1, wherein the system, further comprising a Thrust Allocation Optimization module and a Force Demand Adder module, solves an optimization problem, utilizing a low-frequency force demand signal computed by the Force Demand Adder module, for further calculating a low-frequency power demand value for the propulsion device; and the low-frequency power demand value is further transmitted as a feedforward signal for the pre-planning and the allocation of power and energy in the power plant.

13. The system according to claim 12, wherein the feedforward signal related to the low-frequency power demand value is used by the Energy Control Unit for adapting the base load for the at least one power generator.

14. The system according to claim 9, wherein the system, also comprising a Control Law Module, converts the maximum available load ramp value to a maximum jerk value, and the maximum jerk value is further used for adapting the gain values within the Control Law Module to prevent controller instability in the Control Law Module.

15. The system according to claim 1, wherein the system, also comprising a State of Charge Load Control Unit for the at least one energy storage device, issues a battery State of Charge (SOC) signal, wherein the system uses the SOC signal and the energy requirements predicted by the computational means to adapt the setpoint or base load of the at least one power generator.

16. The system according to claim 1, wherein the feedforward signals, also comprising high frequency feedforward signals, are used to allocate transient loading conditions to the at least one energy storage device.

17. The system according to claim 1, wherein the prediction of power and energy requirements includes models, lookup tables and energy consumption profiles for the at least one consumer under different operating conditions.

18. The system according to claim 17, wherein the models, lookup tables and profiles are updated at predetermined time intervals to improve the accuracy or validity of the models, lookup tables and profiles.

* * * * *